US010030689B2

(12) United States Patent
Thielmann et al.

(10) Patent No.: US 10,030,689 B2
(45) Date of Patent: Jul. 24, 2018

(54) MOUNTING SYSTEM FOR MOUNTING OF EQUIPMENT IN PARTICULAR ELECTRICAL APPLIANCES

(71) Applicant: RITTAL GMBH & CO. KG, Herborn (DE)

(72) Inventors: Bodo Thielmann, Siegbach (DE); Kurt-Michael Schaffer, Eckental (DE); Koen Terwijn, Gouda (NL)

(73) Assignee: RITTAL GMBH & CO. KG (DE)

( * ) Notice: Subject to any disclaimer, the term of this patent is extended or adjusted under 35 U.S.C. 154(b) by 0 days.

(21) Appl. No.: 15/124,980

(22) PCT Filed: Mar. 11, 2015

(86) PCT No.: PCT/DE2015/100103
§ 371 (c)(1),
(2) Date: Sep. 9, 2016

(87) PCT Pub. No.: WO2015/135535
PCT Pub. Date: Sep. 17, 2015

(65) Prior Publication Data
US 2017/0074312 A1    Mar. 16, 2017

(30) Foreign Application Priority Data

Mar. 12, 2014  (DE) .................. 10 2014 103 318
Mar. 12, 2014  (DE) .................. 10 2014 103 338

(51) Int. Cl.
*F16B 27/00*  (2006.01)
*F16B 37/04*  (2006.01)
(Continued)

(52) U.S. Cl.
CPC ............ *F16B 37/041* (2013.01); *F16B 2/005* (2013.01); *F16B 2/065* (2013.01); *F16M 13/02* (2013.01); *H01R 4/46* (2013.01)

(58) Field of Classification Search
CPC ............................ F16B 37/044; F16B 37/04
(Continued)

(56) References Cited

U.S. PATENT DOCUMENTS 4,219,064 A * 8/1980 Lozano ................ F16B 37/041
411/103
4,657,296 A * 4/1987 Nishii .................... B60R 19/50
293/1
(Continued)

FOREIGN PATENT DOCUMENTS

DE      8533398 U1    2/1986
DE      4431246 C1    2/1996
(Continued)

OTHER PUBLICATIONS

International Search Report (in English and German) and Written Opinion (in German) for PCT/DE2015/100103, dated Jul. 16, 2015; ISA/EP.

*Primary Examiner* — Gary W Estremsky
(74) *Attorney, Agent, or Firm* — Harness, Dickey & Pierce, P.L.C.

(57) ABSTRACT

A fastening system for assembling appliances, in particular electrical appliances, comprising at least one profile rail provided with openings and comprising at least one quick-fastener which has a body in which at least one internal thread is formed, is characterized in that the body has over its length (L) at least two spaced-apart internal threads, wherein, in an exact position of the quick-fastener relative to the profile rail, each of the internal threads is brought into alignment with one of the openings of the profile rail, and in that a clamping blade having the same length L as the body is attached to the body, which clamping blade forms between it and the body a gap for receiving the profile side and holds the body against the profile rail by friction.

25 Claims, 6 Drawing Sheets

(51) Int. Cl.
*F16B 2/00* (2006.01)
*F16B 2/06* (2006.01)
*F16M 13/02* (2006.01)
*H01R 4/46* (2006.01)

(58) Field of Classification Search
USPC .................. 411/85, 174, 175, 172; 211/26
See application file for complete search history.

(56) References Cited

U.S. PATENT DOCUMENTS

| | | | |
|---|---|---|---|
| 4,676,706 A | 6/1987 | Inaba | |
| 5,807,008 A | 9/1998 | Schwenk et al. | |
| 6,305,556 B1 * | 10/2001 | Mayer | G06F 1/18 211/175 |
| 6,443,677 B1 * | 9/2002 | Patterson, Jr. | F16B 37/041 411/112 |
| 6,523,918 B1 * | 2/2003 | Baiza | H05K 7/1489 211/26 |
| 6,842,949 B2 | 1/2005 | Warren | F16G 11/06 24/115 H |
| 6,889,414 B2 * | 5/2005 | Korsedal | B25B 23/00 29/271 |
| 6,930,886 B2 * | 8/2005 | Velez | H05K 7/1489 211/187 |
| 7,434,986 B2 * | 10/2008 | Ignatowicz | G01J 5/0003 340/540 |
| 7,658,579 B1 * | 2/2010 | Stewart | B60G 13/003 280/788 |
| 7,941,930 B2 * | 5/2011 | Guip | B25F 5/006 173/162.2 |
| 8,092,115 B1 * | 1/2012 | McLeod | H04Q 1/02 312/223.2 |
| 8,901,438 B2 * | 12/2014 | Lewis, II | H05K 5/0234 174/50 |
| 2001/0037985 A1 | 11/2001 | Varghese et al. | |

FOREIGN PATENT DOCUMENTS

| | | |
|---|---|---|
| DE | 19544834 C1 | 2/1997 |
| DE | 202012002005 U1 | 3/2012 |
| EP | 0751308 A1 | 1/1997 |
| EP | 1324647 A1 | 7/2003 |
| EP | 1903219 A2 | 3/2008 |
| FR | 2584465 A1 | 1/1987 |
| JP | S5046854 U | 5/1975 |
| JP | S5753694 U | 3/1982 |

* cited by examiner

MOUNTING SYSTEM FOR MOUNTING OF EQUIPMENT IN PARTICULAR ELECTRICAL APPLIANCES

CROSS-REFERENCE TO RELATED APPLICATIONS

This application is a 371 U.S. National Stage of International Application No. PCT/DE2015/100103, filed Mar. 11, 2015, which claims priority to German Applications 10 2014 103 318.3 and 10 2014 103 338.8 both of which were filed on Mar. 12, 2014. The entire disclosures of the above applications are incorporated herein by reference.

FIELD

The disclosure relates to a fastening system for assembling appliances, in particular electrical appliances, having at least one profile rail with openings and having at least one quick fastener with a body in which at least one internal thread is formed.

BACKGROUND

This section provides background information related to the present disclosure which is not necessarily prior art.

Profile rails are known in many embodiments; DE 20 2012 002 005 U1 shows one example. Known profile rails, as perforated profile rails, are provided with a row of holes to clip in cage nuts. Cage nuts are mostly square nuts that are held in a similarly square cage of sheet metal. By means of the cage, the nut can be fixed to a sheet of metal, so that a thread can be provided even on thin sheets, such as profile rails, in which a thread cannot be cut. Cage nuts are standardized in DIN 557.

Normally, profile rails are attached to the side walls of racks, so that 19-inch industrial standardized appliances can be bolted to the front panel through attaching holes provided in the appliance on the left and right in said panel and held securely. Usually, the appliances are attached using four bolts in the corner areas of their front plate, sometimes also using two bolts at both ends of the center line of the front plates. The height of the front plates of the industrial standardized appliances is determined by a grid in units of height, where one unit of height is specified as 1.75 inches, or 44.45 mm.

A 19-inch rack system also follows certain standards, or is standardized, for example by IEC 60297 or the corresponding metric grid system following IEC 60917. Profile rails can also be used outside of racks, right down to the individual rail that is installed horizontally or vertically.

If cage nuts are to be used when attaching appliances in 19-inch rack systems, the matching profile rail has a square hole that is somewhat smaller than the cage so that a support is available between sheet metal nut to absorb axial thread forces. The cage nuts must be pre-tightened manually in order to position them in the square cutouts in the profile rails, where there is a risk of their twisting and slipping. Removing a cage nut is correspondingly laborious and often requires considerable effort. In the case of a cage nut, quick fastening is out of the question.

SUMMARY

This section provides a general summary of the disclosure, and is not a comprehensive disclosure of its full scope or all of its features.

The object of the present disclosure is, therefore, to provide a fastening system for assembling appliances, using which a profile rail can be equipped with an internal thread in the desired position.

In accordance with the disclosure, provision is made for the body to have at least two spaced apart internal threads along its length L, whereby with the quick fastener in an exact position with respect to the profile rail, each of the internal threads is brought into alignment with one of the openings in a profile rail, and on the body a clamping blade of the same length L as that of the body is attached that forms an open space between itself and the body to receive the profile rail and that holds the body to the profile rail by friction or also by a non-positive connection. Since the internal thread is integrated into the body, an exact relative positioning of at least two internal threads is always maintained, wherein the body can be displaced along the profile rail until the alignment of the internal thread with the respective desired opening is achieved. The quick fastener is in a precise position when each of the internal threads lies above an opening in a profile rail.

An internal thread in the sense of the disclosure can be a component or arrangement of components that provides a convolution in the form of an internal thread. It may be, for example, a nut. The internal thread can serve to receive a screw, a bolt or similar with a matching external thread.

Because the openings lying next to each other are oriented to one another, a longitudinal direction of the profile rail is defined. The transverse direction of the profile rail, in which only one opening is covered, is defined perpendicular to the longitudinal direction. A quick fastener in accordance with the present disclosure is initially placed in the transverse direction on the profile rail and can then be moved in the longitudinal direction of the profile rail because it is being held only by frictional force. Alternatively or additionally, the quick fastener can be attached to the profile rail using non-positive connecting elements, such as latching elements that can be allocated and held precisely in position on the profile rail. Removing the quick fasteners from the profile rail is similarly possible in every position by pulling transversely, with an extra swiveling motion if necessary.

In one embodiment the clamping blade is attached flexibly to the body so that it is ensured that the quick fastener can be moved to float above the profile rail without losing its frictional or non-positive connection.

Furthermore, the body can be configured essentially rectangular. Provision can be made for the body to have a chamfered edge to assist when inserting onto the profile rail.

It is preferable if the body has a slot for each internal thread in which a nut is positioned securely against rotation. Preferably the nut is a cage nut with a square or rectangular cross-section that sits in its assigned slot to prevent loss.

Provision can further be made for the clamping blade to extend in a precise position in the transverse direction across the openings in the profile rail. In this way, the body is prevented from tipping when the quick fastener is placed on the profile rail.

In order to extend the potential of screw fastening, provision should be made with at least this embodiment for the clamping blade to have openings that are aligned with an assigned internal thread on the body.

In order to further ensure the frictional connection, the body and the clamping blade are arranged relative to each other in such a manner that an open space remains between them tapering towards an open longitudinal edge of the clamping blade.

Furthermore, the body and/or the clamping blade can be furnished with means to increase the frictional connection to the profile rail. Said means can be fluting, for example, that forms part of the body.

In accordance with a further embodiment, the clamping blade is L-shaped in cross-section, where the length of a first leg is greater than the thickness of the profile rail in the area of the openings. The length of a second leg is preferably selected in such a manner that the clamping blade at least partially overlaps the internal thread of the body.

The clamping blade can have at least one recess that exposes markings formed on the profile rail in a precise position with respect to the profile rail. Such markings facilitate installation of appliances to two oppositely located profile rails without tipping.

Provision can also be made for the body and/or the clamping blade to have at least one nub projecting into the open space which retains the quick fastener in a precise position with respect to the profile rail, in which position the nub is received in a recess or an opening in the profile side.

The profile rail can be part of an assembly array, where the openings are equally spaced in the direction of the profile rail and where three sequential openings define one unit of height, for example of a rack frame.

In order to ensure equalization in potential between the profile rail and the quick fastener, the quick fastener can have a potential equalization element that has, or consists of, an electrically conductive material and that both extends into the open space and also makes electrical contact with the internal thread or a nut or similar that provides the internal thread.

The potential equalization element can further extend over a surface of the clamping blade that faces away from the open space. The potential equalization element can be integrated into the body and/or the clamping blade completely or partially, for example, integrally cast. It can also make electrical contact with the internal thread and enclose the clamping blade on one external side.

Furthermore, the clamping blade can consist of a first material and the potential equalization element of a second material, where the first material is softer than the second material and where the potential equalization element projects into the open space with a supporting section that becomes a contact tip so that, when the quick fastener is positioned, the contact tip is pressed onto the profile rail through the surface of the clamping blade that faces away from the open space. The second material is preferably flexible. The potential equalization element can be configured as a contact spring.

Furthermore, the contact tip of the potential equalization element can be enclosed by the first material of the clamping blade to prevent contact so that it is only pressed out of the clamping blade when the quick fastener is placed on the profile rail.

In one embodiment the body is configured of plastic and the clamping blade of a metal, where the clamping blade is a single piece and connected inseparably to the body and preferably cast into the body.

Furthermore, the clamping blade can have at least one contact spring on its second leg for the electrical contact with the profile rail configured as a push-through and extending into the open space.

In addition, provision can be made for the clamping blade to have at least one contact spring on the surface facing away from the open space configured as a push-through to make the electrical contact with an electrical appliance.

In one embodiment the quick fastener is prepared as continuous material, in rolls or in bar form with a plurality of internal threads, wherein the body of the quick fastener is divided into housing sections, equal or varying in length, each of which has a specific number of internal threads, and wherein the housing sections are connected to each other by predetermined break points.

Alternatively, several quick fasteners can be disposed along a connecting strip cut to length as required while retaining the spacing or a whole-number multiple of the spacing between the internal threads.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In what follows the disclosure is to be explained solely as an example using the attaching drawing. The representations of the Figures are not necessarily true to scale.

DETAILED DESCRIPTION

Example embodiments will now be described more fully with reference to the accompanying drawings.

Figure 1:
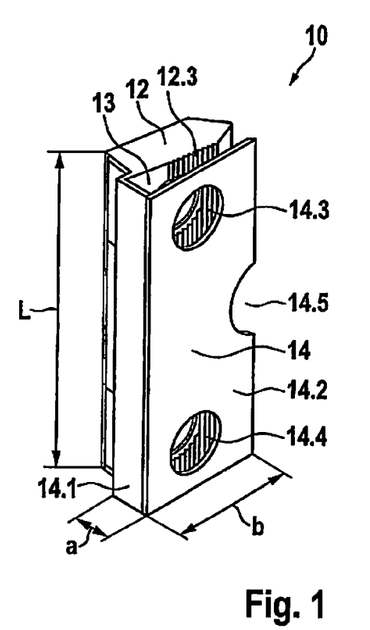
FIG. 1 shows a perspective view of one embodiment of a quick fastener for a fastening system in accordance with the present disclosure, viewed from the side of the clamping blade.
Figure 2:
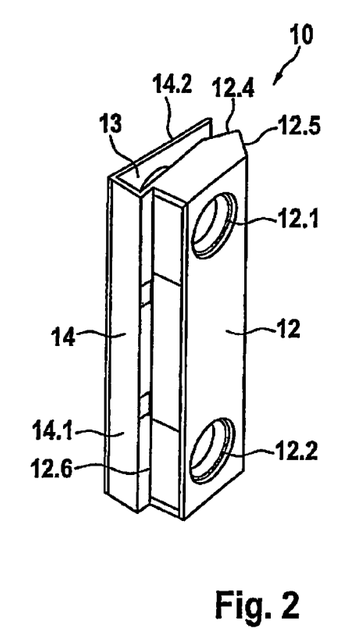
FIG. 2 shows a perspective view of the quick fastener from the side of the body.

FIG. 1 shows a perspective view of one embodiment of a quick fastener 10 for a fastening system for assembling appliances, specifically electrical appliances, that is constructed from an essentially rectangular body 12 and a clamping blade 14. The body 12 has a length L, as does the clamping blade 14, which holds the body 12 by friction to a profile rail in the assembled position. In the present embodiment the clamping blade is L-shaped, wherein one leg 14.1 has a length a, second leg 14.2, which runs perpendicular to the first leg 14.1, has a length b. The clamping blade 14 further has two openings 14.3, 14.4 in the leg 14.2, which, as will be further described in conjunction with FIG. 2, are positioned in a specific way. An approximately semi-circular recess 14.5 is provided centrally between the openings 14.3, 14.4 on the open edge of the leg 14.2 of the clamping blade 14. It can be seen further from FIG. 1 that fluting 12.3 is provided on the body 12 on the side that faces the clamping blade 14. The fluting serves to improve the frictional connection between the quick fastener 10 and a profile rail. An open space 13 remains between the body 12 and the clamping blade 14 that initially narrows starting from the leg 14.1 towards the open end of the leg 14.2 and then expands again because of the particular configuration of the body 12.

The shape of the body 12 can be seen better from the perspective view of FIG. 2. The body 12 comprises two internal threads 12.1, 12.2 spaced apart from each other that are essentially aligned with the openings 14.3, 14.4 of the clamping blade 14 (FIG. 1). The body 12 further has at its end that lies opposite the open end of the leg 14.2 of the clamping blade a first chamfer 12.4 and a second chamfer 14.5. The first chamfer 12.4 acts as an aid to placement when being mounted on a profile rail. As a result of this chamfer 12.4, the initially narrowing open space 13 between the body 12 and the clamping blade 14 is expanded again. The body 12 further has opposite its open end a step 12.6 to which the leg 14.1 of the clamping blade 14 is attached. In this way, the result is that the clamping blade 14 is attached flexibly to the body 12 whereby this measure improves the frictional connection between the quick fastener 10 and a profile rail.

Figure 3:
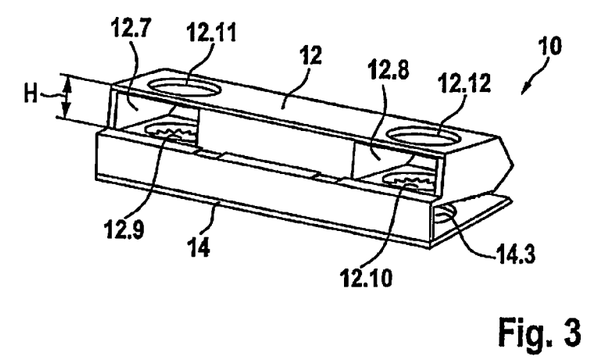
FIG. 3 shows a view of the quick fastener from which the position of the slots for receiving nuts in particular can be seen.

FIG. 3 shows the quick connector 10 from FIG. 2 in a position rotated by about 90°, from which the location of slots 12.7, 12.8 can be seen particularly well, said slots being intended to receive nuts, as will be explained in conjunction with FIG. 4. Each slot 12.7, 12.8 is essentially rectangular and extends over almost the entire height H of the body 12. The dimensions of the slots 12.7, 12.8 are selected in such a manner that a commercially available cage nut or any other nut can be accommodated with no risk of rotation or loss, as said dimensions are also used in the case of cage nuts. To make the thread of the cage nut accessible, the slots 12.7, 12.8 are provided with openings 12.9, 12.11 or 12.10, 12.12 positioned opposite each other which are aligned with the openings 14.3, 14.4 of the clamping blade 14 already discussed in FIG. 1. As a result of the inclined position of the body with respect to the clamping blade 14, easily recognizable in FIG. 3, nuts sitting in the slots 12.7, 12.8 are prevented from accidently slipping out of the quick fastener 10.

Figure 4:
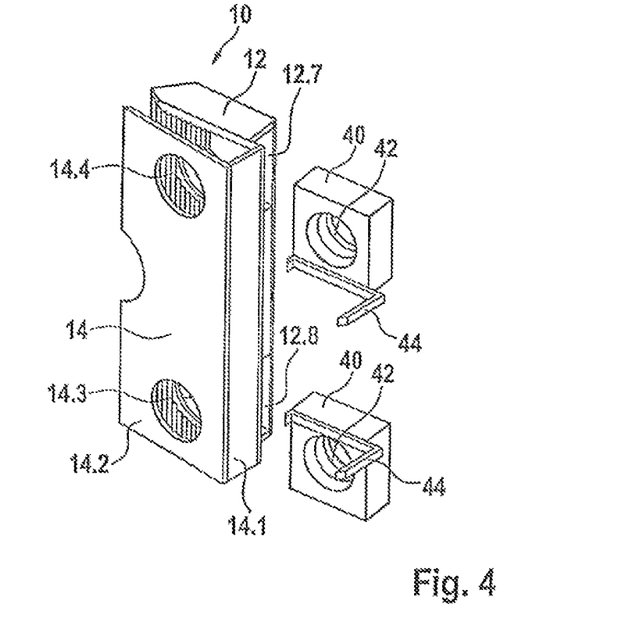
FIG. 4 shows a further view of the quick fastener that shows how nuts are to be installed and how grounding is achieved.

FIG. 4 shows schematically how two nuts 40 are to be inserted into the slots 12.7 and 12.8 of the body 12. Each nut 40 adjoins a ground clip 44 which in the assembled state is taken over the leg 14.1 of the clamping blade and locked to the leg 14.2. In the assembled state, the nuts 40 sit in their respective slots such that their internal threads 42 align not only with the openings 12.9, 12.11; 12.10, 12.12 (FIG. 3) of the body 12 but essentially also with the openings 14.3, 14.4 of the clamping blade so that the desired threaded connection is subsequently possible.

Figure 5:
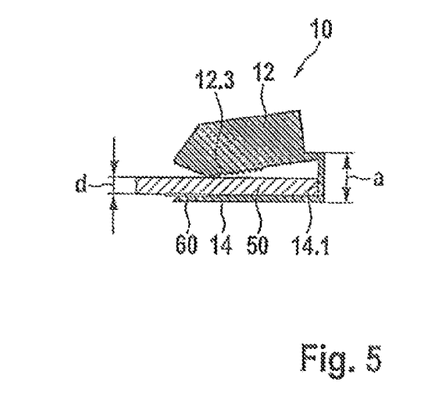
FIG. 5 shows a sectioned view of a quick fastener sitting on a profile rail.

FIG. 5 shows a sectioned view of a quick fastener 10 that sits on a profile rail 50. It can be seen that length a of the first leg 14.1 of the clamping blade 14 is larger than the thickness d of the profile rail 50. As a result of the fluting 12.3 on the body 12, which now lies on the surface of the profile rail 50, the frictional connection between the quick fastener 10 and the profile rail 50 is improved. A grounding strip 60 can be provided to further improve the electrical contact in the case of uncoated profile rails 50.

Figure 6:
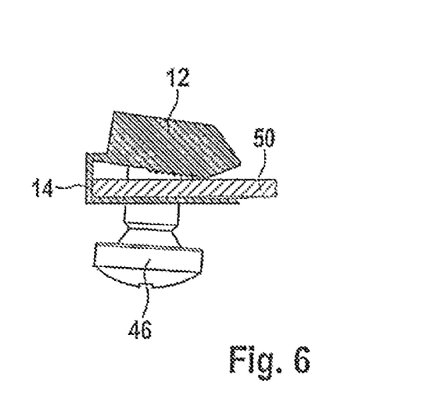
FIG. 6 shows a sectioned view of a quick fastener on a profile rail with a threaded connection.
Figure 7:
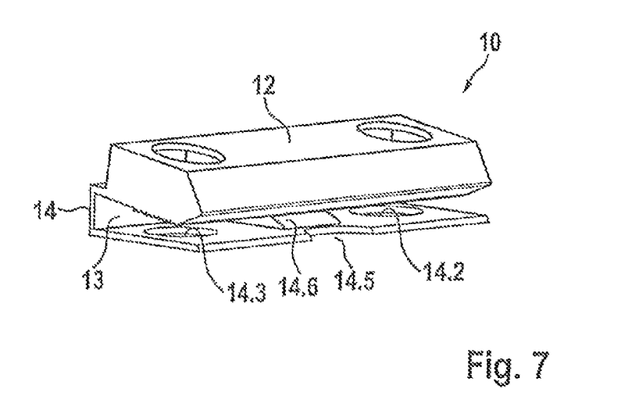
FIG. 7 shows a view of the quick fastener from which additional details for positioning can be seen.

FIG. 6 shows the assembly situation from FIG. 5 in a view rotated by 180°, wherein a screw 46, as explained previously in conjunction with FIGS. 1 to 4, is screwed through the corresponding openings of clamping blade 14 and body 12 into the threads 42 of the nuts 40 (FIG. 4), to fasten appliances (not shown). FIG. 7 shows a further constructional detail of the quick fastener 10, in which the clamping blade 14 has a nub 14.6 that extends into the open space 13 between the body 12 and the clamping blade 14 and is disposed centrally between the openings 14.3, 14.4 close to the recess 14.5. The purpose of the nub 14.6 is to determine an exact position of the quick fastener 10 on a profile rail 50.

Figure 8:
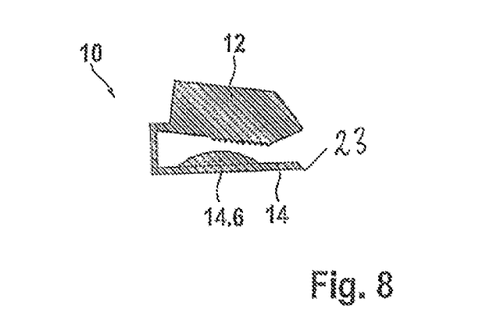
FIG. 8 shows a sectioned view of the quick fastener with a nub for assembly.

FIG. 8 shows a sectioned view of FIG. 7 in the area of the nub 14.6 from which it is clear that when the quick fastener is not installed, a clearance remains between the body 12 and the clamping blade 14 even in the area of the nub 14.6.

Figure 9:
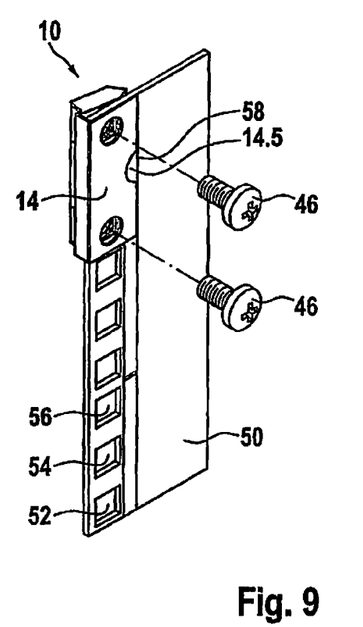
FIG. 9 shows a perspective view of a quick fastener on a profile rail.

FIG. 9 shows a perspective view of a quick fastener 10 that sits on a profile rail 50. The profile rail 50 has regularly spaced openings 52, 54, 56 for each unit of height of the profile rail 50. The number of the unit of height is given next to the respective opening, normally next to the opening in the middle, e.g. 54. When in an exact position, the quick fastener thus sits so that the recess 14.5 of the clamping blade 14 reveals the marking 58 of a unit of height. Then all the openings of the quick fastener 10 align precisely with the corresponding openings (e.g. 52, 56) of the profile rail 50 so that correctly positioned assembly can be carried out using screws 46.

Figure 10:
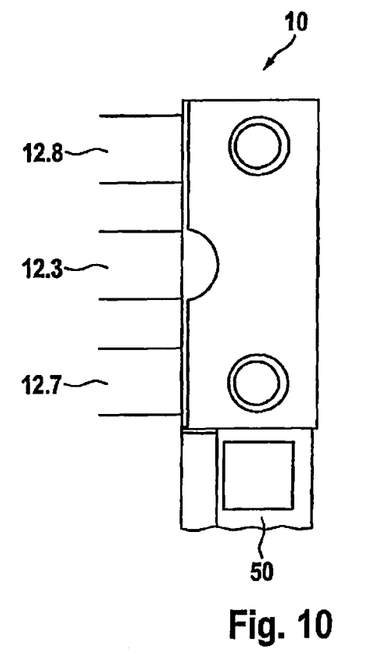
FIG. 10 shows a structural diagram of a quick fastener.

FIG. 10 shows a plan view of a quick fastener 10 that sits on a profile rail 50. An additional slot 12.3 can be provided between the slots 12.7 and 12.8 of the body (not visible here) to expand the possibilities for assembly.

Figures 11A, 11B, 11C, 11D, 11E:
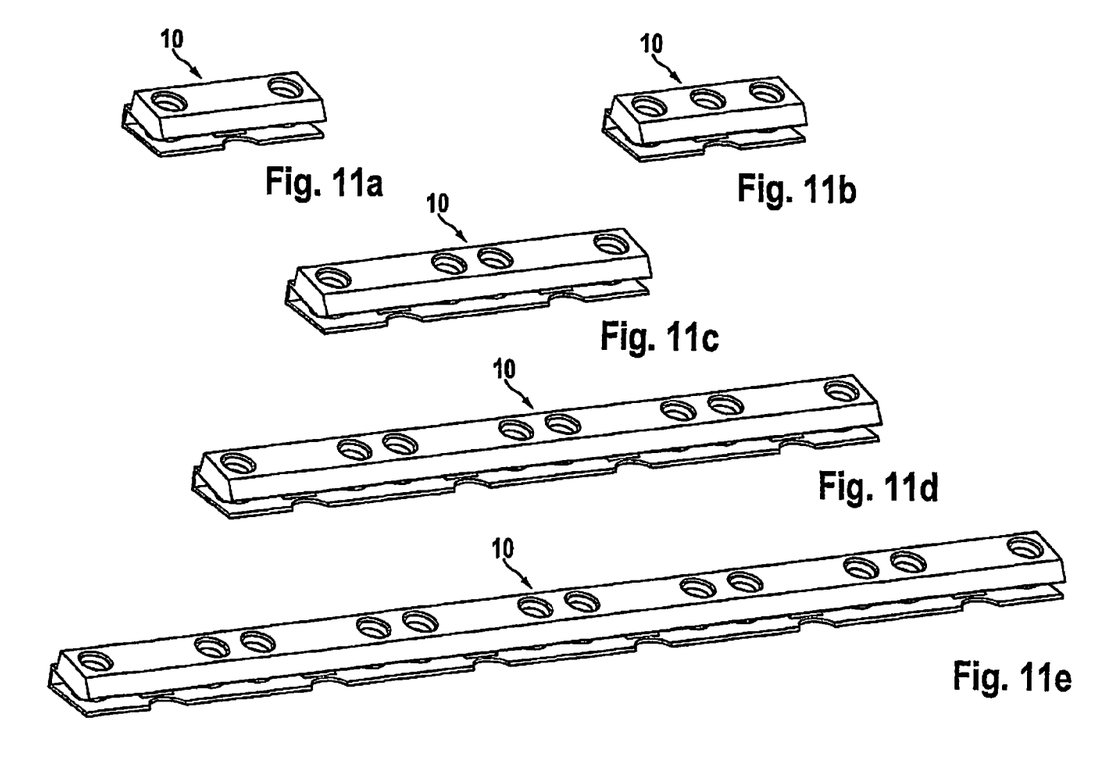
FIG. 11 shows variations of the quick fastener as they can be used in a fastening system for assembling appliances.

As shown in FIG. 11, the quick fastener in accordance with embodiment (a) can be expanded into a quick fastener in accordance with embodiment (b). With an appropriate configuration of the clamping plate with an opening that, for example, can also pass through the nub (c.f. FIG. 7), an appliance that comprises a front plate, for example, with a unit of height, can be fastened not just at the four corners but at alternative locations.

Additional embodiments of a quick fastener are possible that are basically generated by stringing together quick fasteners in accordance with FIGS. 1 through 8. Thus, in the case of embodiment (10), two quick fasteners of this type are strung together, in version (d) four, in version (e) six. Connected combinations of versions (a) and (b) are also possible.

All this provides a fastening system with which nuts intended for assembly can be positioned easily and which are just as easy to remove, for example, when the placement of a rack is changed.

Figure 12:
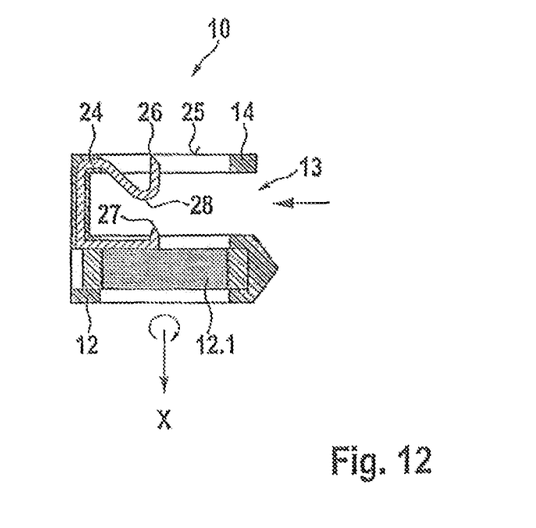
FIG. 12 shows a sectioned view of a quick fastener with potential equalization element.
Figure 13:
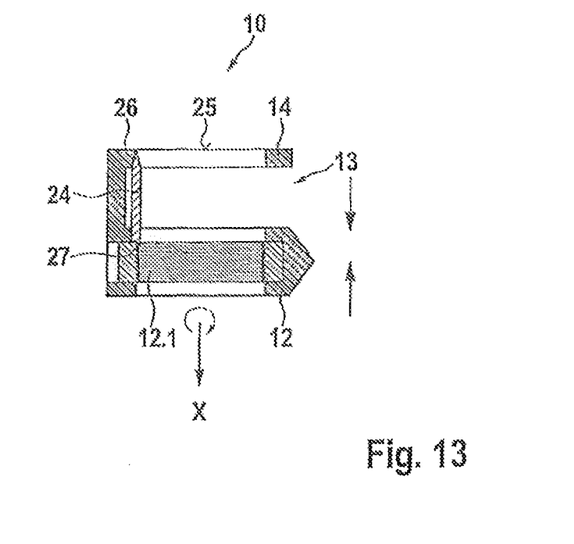
FIG. 13 shows a sectioned view of a further quick fastener with potential equalization element.

FIGS. 12 and 13 show sectioned views of two embodiments of a quick fastener 10 that has an integral potential equalization element 24. The potential equalization element 24 is intended to equalize electrical potential between a component that is attached to the profile rail by means of the fastening system and the profile rail. With the version illustrated in FIG. 12, the potential equalization element 24 is configured as a contact spring that is partially integrated into the body 12 and the clamping plate 14. In the area of the open space 13 to receive the profile rail, a supporting piece of the potential equalization element 24 projects into the open space 13. The consequence is that when a profile rail is inserted into the open space 13, the profile rail strikes the supporting piece 28 and pushes the contact tip 26, which is housed in the clamping blade 14 to prevent contact, through a surface 25 of the clamping blade 14 facing away from the open space 13 out of the clamping blade 14; the contact tip 26 makes electrical contact for potential equalization with an appliance or component that is to be attached to the profile rail using the fastening system. Provision can also be made for the force necessary to push the contact tip 26 out of the clamping blade 14 to be generated only at the time of bolting together, so that the electrical contact for potential equalization is completed only the time of bolting together. In addition, the clamping blade 14 has an additional contact tip 27 at the opposite end from contact tip 26 that projects out of the body 12 into the open space on the side of the body 12 facing the open space 13 so that when a profile rail is pushed into the open space 13, or at the time of bolting together, an electrical contact is made between the additional contact tip 27 and the profile rail. The clamping blade 14 and the body 12 can be made of a plastic injection molding, for example, while the potential equalization element 24 is a metallic component. Furthermore, the potential equalization element 24 can be set into the clamping blade 14, or the body 12 respectively, in such a manner that, in the uninstalled state, only its additional contact tip 27 and the supporting section 28, which is a folded over piece, protrude from the body 12, or the clamping blade 14 respectively. The clamping blade 14 and the body 12 can be configured as a single plastic piece, wherein the potential equalization element 24 lends additional strength and elasticity to this plastic component consisting of body 12 and clamping blade 14.

In the embodiments shown in FIGS. 12 and 13, the clamping blade 14 is composed essentially of two sides arranged perpendicular to each other, which, together with the body 12, delineate the open space 13 on three sides and leave an opening to insert a profile rail. In the embodiment depicted in FIG. 13 a potential equalization element 24 with opposite contact tips 26, 27 is let into the side of the clamping blade 14 connecting the clamping blade 14 to the body 12. In the unfinished state of the quick fastener shown in FIG. 13, a first contact tip 27 contacts the internal thread, for example a cage nut or similar, while the opposite contact tip 26 is positioned just below the outer surface 25 inside the clamping blade 14. If a profile rail is inserted into the open space 13 and a fastening screw is screwed into the internal threads through the clamping blade 14, the clamping blade 14 is deformed in such a manner that the contact tip 26 of the potential equalization element 24 comes through the surface 25 of the clamping blade 14 and makes electrical contact with the component bolted to the profile rail with the aid of the fastening system. The clamping blade 14 is preferably made from a plastic material, while the internal thread 12.1 can be a metal nut or similar so that the potential equalization element 24 is supported via the contact tip 27 against the internal thread 12.1 and makes electrical contact with said thread so that it is ensured that the potential equalization element penetrates the upper surface when bolted together.

The features of the disclosure disclosed in the preceding description, in the drawings and in the claims can be essential, both individually and in any combination, to the realization of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A fastening system for assembling appliances comprising at least one profile rail furnished with openings and at least one quick fastener that has a body in which at least one internal thread is formed, wherein the body has at least two internal threads spaced apart from each other along its length (L), wherein each of the internal threads is brought into alignment with one of the openings on the profile rail in an exact position of the quick fastener with respect to the profile rail, and in that a clamping blade having the same length L as the body is attached to the body, forming an open space between itself and the body to receive the profile rail and holding the body by friction to the profile rail;

wherein the body has a slot for each internal thread in which a nut is positioned secured against rotation.

2. The fastening system according to claim 1, wherein the clamping blade is attached flexibly to the body.

3. The fastening system according to claim 1, wherein the body is configured essentially rectangular.

4. The fastening system according to claim 1, wherein the body has a chamfered edge to assist in placing it onto the profile rail.

5. The fastening system according to claim 1, wherein the nut is a cage nut which sits in its assigned slot to prevent loss.

6. The fastening system according to claim 1, wherein the clamping blade, in a precise position in the transverse position extends over the openings in the profile rail.

7. The fastening system according to claim 1, wherein the clamping blade has openings that are oriented in alignment with an assigned internal thread on the body.

8. The fastening system according to claim 1, wherein the body and the clamping blade are located relative to one another in such a manner that an open space is formed between them narrowing towards an open longitudinal edge of the clamping blade.

9. The fastening system according to claim 1, wherein the body and/or the clamping blade has means to increase the friction to the profile rail.

10. The fastening system according to claim 9, wherein the means to increase the friction to the profile rail are provided in the form of fluting.

11. The fastening system according to claim 1, wherein the clamping blade is L-shaped in cross-section, wherein the length (a) of a first leg is greater than the thickness (d) of the profile rail in the area of the openings.

12. The fastening system according to claim 11, wherein the length (b) of a second leg is selected in such a manner that the clamping blade at least partially overlaps the internal threads of the body.

13. The fastening system according to claim 1, wherein the clamping blade has at least one recess which exposes markings on the profile rail when in a precise position with respect to the profile rail.

14. The fastening system according to claim 1, wherein the body and/or the clamping blade has at least one nub projecting into the open space which retains the quick fastener in a precise position with respect to the profile rail in which the nub is accommodated in a recess or an opening in the profile rail.

15. The fastening system according to claim 1, wherein the profile rail is part of an assembly array in which the openings are equally spaced towards the profile rail and in which three consecutive openings define a unit of height for a rack frame.

16. The fastening system according to claim 1, wherein the quick fastener has a potential equalization element which has, or consists of, an electrically conductive material and both extends into the open space and makes electrical contact with the internal thread.

17. The fastening system according to claim 16, wherein the potential equalization element extends above a surface of the clamping blade that faces away from the open space.

18. The fastening system according to claim 16, wherein the clamping blade consists of a first material and the potential equalization element of a second material, wherein the first material is softer than the second material, wherein the potential equalization element, with a supporting section that turns into a contact tip, projects into the open space so that the contact tip is pushed through the surface of the clamping blade facing away from the open space when the quick fastener is placed on the profile rail.

19. The fastening system according to claim 18, wherein the contact tip of the potential equalization element is enclosed by the first material of the clamping blade secure against contact and is pushed out of the clamping blade when the quick fastener is placed on the profile rail.

20. The fastening system according to claim 1, wherein the quick fastener has a potential equalization element that has, or consists of, an electrically conductive material and projects into the open space so that when placed on the profile rail an electrical contact is created with the profile rail by way of the support element, and the contact tip makes electrical contact through the surface with an additional component, in particular an electrical appliance.

21. The fastening system according to claim 1, wherein the body is formed of plastic and the clamping blade of a metal, wherein the clamping blade is a single piece and connected permanently to the body and is preferably molded into the body.

22. The fastening system according to claim 21, wherein the clamping blade has at least one contact spring on its second leg, taking the form of a push-through and projecting into the open space for the electrical contact of the profile rail.

23. The fastening system according to claim 21, wherein the clamping blade has at least one contact spring on its surface facing away from the open space, taking the form of a push-through for the electrical contact with an electrical appliance.

24. The fastening system according to claim 1, wherein the quick fastener is provided as continuous material, on rolls or in bar form with a plurality of internal threads, wherein the body of the quick fastener is divided into housing sections identical or differing in length that have a specific number of internal threads in each case and wherein the housing sections are connected by predetermined breaking points.

25. The fastening system according to claim 1, wherein several quick fasteners are disposed along a connecting strip cut to length as required while retaining the spacing or a whole-number multiple of the spacing between the internal threads.

* * * * *